United States Patent [19]

Bernas

[11] 4,335,074

[45] Jun. 15, 1982

[54] LIQUID AND VAPOR-TIGHT VESSEL FOR PERFORMING DECOMPOSITION REACTIONS

[76] Inventor: Bedrich Bernas, 13 Soroka St., Haifa, Israel

[21] Appl. No.: 219,492

[22] Filed: Dec. 23, 1980

Related U.S. Application Data

[63] Continuation-in-part of Ser. No. 960,539, Nov. 14, 1978, abandoned.

[30] Foreign Application Priority Data

Nov. 14, 1977 [IL] Israel ........................................ 53370

[51] Int. Cl.³ .............................................. B01L 3/00
[52] U.S. Cl. .................................. 422/102; 81/90 C; 215/230; 215/302; 220/256; 220/284; 220/288; 220/410; 422/241; 422/242
[58] Field of Search ............... 422/119, 241, 242, 310, 422/102; 215/230, 302; 220/408, 468, 274, 284, 85 D, 410, 256, 288; 81/90 C, 90 D, 90 F

[56] References Cited

U.S. PATENT DOCUMENTS

| | | | |
|---|---|---|---|
| 761,523 | 5/1904 | Miller, Jr. ............................ | 81/90 C |
| 1,150,596 | 8/1915 | Hollingshead .................... | 220/284 X |
| 1,579,992 | 4/1926 | Altman ............................... | 81/90 C |
| 2,389,954 | 11/1945 | Burns ................................. | 81/90 C X |
| 2,442,920 | 6/1948 | De Vries ............................ | 81/90 C X |
| 2,449,511 | 9/1948 | Russell .............................. | 220/284 X |
| 2,991,676 | 7/1961 | Bond .................................. | 81/90 |
| 3,216,600 | 11/1965 | Dreps ................................ | 215/230 |
| 3,430,804 | 3/1969 | Bernas .............................. | 220/408 X |
| 3,933,440 | 1/1976 | Woolley ............................. | 422/102 |
| 4,138,029 | 2/1979 | Mahoney ........................... | 215/230 |
| 4,151,253 | 4/1979 | Waggoner et al. .............. | 422/102 X |
| 4,248,831 | 2/1981 | Hughes ............................. | 422/102 |

*Primary Examiner*—Arnold Turk
*Attorney, Agent, or Firm*—Schwartz, Jeffery, Schwaab, Mack, Blumenthal & Koch

[57] ABSTRACT

A decomposition vessel comprises a rigid bucket of a plastic material resistant to chemical attack, totally enclosed in a supporting metal vessel which consists of a cylindrical supporting member and of a flat cap adapted to be screwed onto the supporting member so as to close the vessel tightly. Sealing means are provided between the opposed flat faces on the cap and the supporting member in the form of a sealing disc adjacent the flat cap and an outwardly exending flange integral with the rigid bucket in contact with the disc and with an upper planar face of the supporting member. The cap can be rotated and closed on the threaded supporting member by means of a closing tool having projecting teeth or pins adapted to engage with slots provided along the top edge of the cap, while the supporting member is held in position in a second tool provided with similar teeth or pins adapted to engage with corresponding slots along the bottom edge of the member; the latter tool is either fixed to a bench or held by hand. The closing pressure is indicated by the position of a mark on the rim of the cap in relation to a scale provided on the outside surface of the supporting member, which permits the selection of the desired pressure after the vessel has been closed by hand, by rotating the upper tool until the respective marks coincide.

7 Claims, 6 Drawing Figures

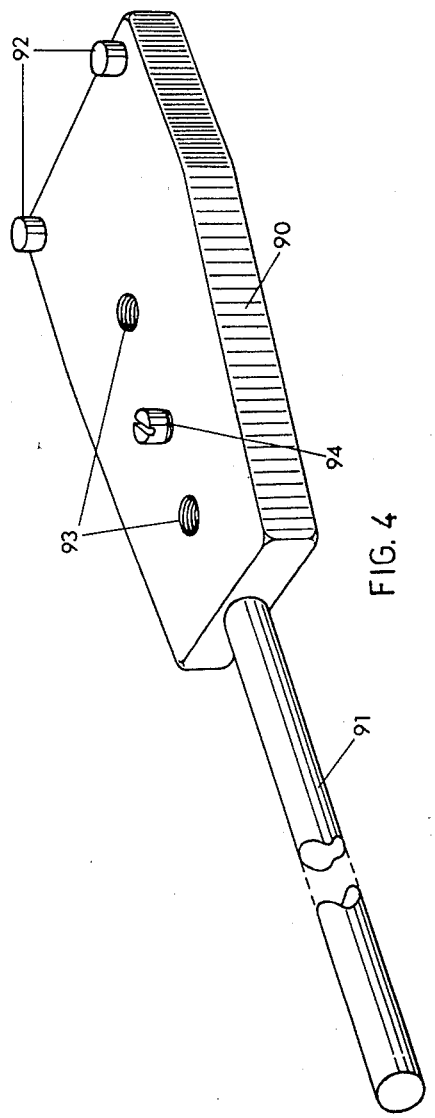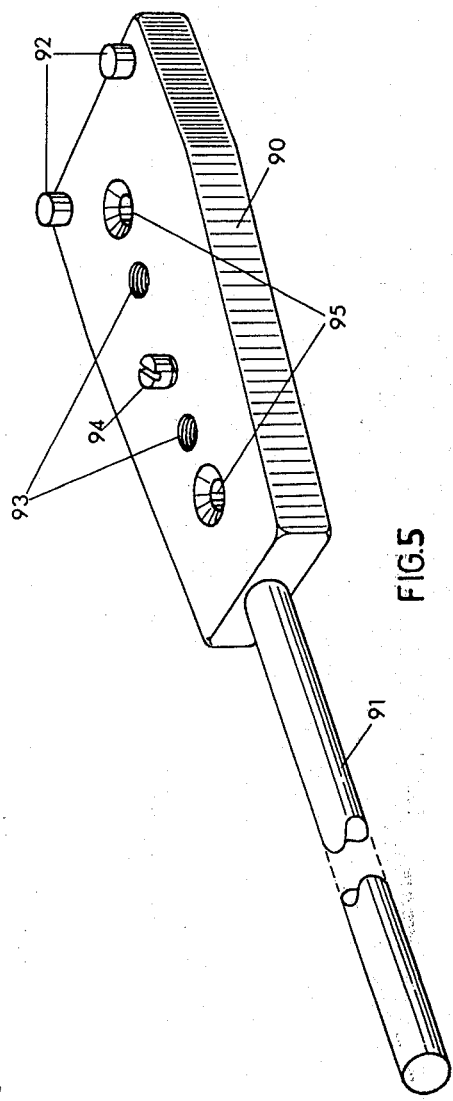

LIQUID AND VAPOR-TIGHT VESSEL FOR PERFORMING DECOMPOSITION REACTIONS

This application is a continuation-in-part application of Ser. No. 960,539, filed Nov. 14, 1978, now abandoned.

This invention relates to a decomposition vessel and relates more particularly to a liquid and vapor-tight container for use in various applications.

Decomposition vessels have to be capable of providing both liquid and vapour-tight seals for extended periods under temperature conditions that may range from relatively low temperatures to relatively high temperatures. It is of utmost importance, for highly accurate analysis, that volatile constituents such as arsene, mercury, zinc or lead ions cannot escape through even the smallest leaks or are lost by chemical reaction with the metal of the decomposition vessel. Since reactants may include highly corrosive acids, the vessels must be resistant thereto to insure against contamination.

These demands are satisfactorily answered by a decomposition vessel of stainless steel provided with a liner and a stopper of polytetrafluoroethylene (Teflon) with a very narrow sealing area between liner and stopper to permit its manually closing in a single and efficient manner for all reactions that do not develop high pressures. A decomposition vessel of this kind, providing a dimensionally optimized sealing contact between a planer rim of a liner of Teflon or another chemically resistant material, and a planar portion of a sealing disc of the same material has been disclosed in my U.S. Pat. No. 3,430,804.

This vessel comprises a rigid, integral supporting member including a bottom, peripheral sides and an upstanding ledge surrounding an opening, a rigid, integral bucket formed of a material resistant to attack by the materials to be placed within said vessel, said bucket having a bottom, peripheral sides including portions dimensioned to fit within said opening and an upstanding, generally planar rim, said bottom and peripheral sides of said supporting member surroundingly engaging and supporting said bottom and peripheral sides of said bucket, a sealing disc formed of a material resistant to attack by the materials to be placed within said vessel, and a cap releasably secured to said supporting member outwardly of said ledge, said peripheral sides of said supporting member including a flange spaced below said ledge and extending outwardly of said ledge, said flange having thread means thereon, and said cap including a downwardly extending flange having thread means thereon adapted to cooperate with said thread means on said flange of said supporting member, said sealing disc including generally planar portions interposed between said cap and said rim which portions are maintained in sealing engagement with said rim when said cap is secured to said supporting member, portions of said bucket spaced immediately beneath said rim extending outwardly of said rim and in overlying engagement with said ledge to increase the support for said rim while minimizing the sealing area between said rim and said portions of said sealing disc whereby the sealing pressure between said rim and said portions of said sealing disc is maximized.

At the time of conceiving the invention the vessel was designed for decomposition of inorganic materials such as silicates or other refractory compounds by acids at relatively low temperatures and pressures, and its object was to be closed manually to a degree that would not destroy the sealing areas by excessive pressure, ensure a long life of both the bucket and the sealing disc and yet prevent volatilization losses.

With progressing technique it became, however, necessary to provide a decomposition vessel adapted for much higher pressures and temperatures than hitherto, in order to serve as a laboratory tool for chemical processes involving temperatures of up to 350° F. and pressures up to 5000 Psi.

The decomposition vessel according to U.S. Pat. No. 3,430,804 which has shown itself very suitable for decomposition of inorganic material by providing both liquid and vapor-tight sealing, has proved to be unsatisfactory for processes developing the aforementioned high pressures and temperatures. These extreme conditions demand that the vessel be closed to an exact sealing pressure which, if too low would not prevent vapors from escaping through the sealing surfaces, and if too high would lead to distortion of the Teflon components and to rapid wear and tear. On the other hand, the supporting member and the cap according to the existing design did not readily stand up to the high stresses exerted and showed permanent deformations after a few runs.

It became, therefore, imperative to find ways and means for securing the cap onto the supporting member by applying a high torque which should correspond to the pressure between the sealing faces of the Teflon components, this pressure being adequate to prevent leakage after temperature and pressure had been raised to the required magnitude. The higher torque applied required, obviously, a change in the design of the vessel components, especially as it was found that the outwardly extending flange of the supporting member did not stand up to the stresses and presented a weak spot.

Taking these points into consideration, it was found necessary to provide specific tools for closing of the vessel and, in order to make the application of these tools possible, to modify the construction of the component parts. In addition, in consequence of the high torque applied by means of these tools it became necessary to give an exact indication of the sealing pressure, or, in other words, it became necessary to provide the operator with means for tightening the cap on the supporting member to the required sealing pressure.

With these objects in view the decomposition vessel disclosed in U.S. Pat. No. 3,430,804 was redesigned to withstand high internal pressure, special tools have been designed for providing the necessary closing torque, and the vessel was provided with means for engagement with these tools, and with means for indicating the torque exerted and the ensuing sealing pressure.

The decomposition vessel, according to the present invention, comprises a rigid cylindrical supporting member, including a bottom, peripheral sides and an upstanding ledge surrounding an opening, raised circumferential screw thread provided on the outside of said peripheral sides, and at least three longitudinal, spaced-apart recesses at the bottom end on the outside of said peripheral sides, open towards the bottom of said supporting member; a rigid bucket formed of a material resistant to attack by the materials to be placed within said vessel, including a bottom and peripheral sides dimensioned to fit within said opening, and an upstanding, generally planar rim, said bottom and said peripheral sides of said supporting member surroundingly engaging and supporting said bottom and said peripheral sides, said rim being in overlying engagement with said ledge of said bucket; a cap releasably secured to said supporting member outwardly of said ledge, said cap including a closed top portion, a downwardly depending skirt provided with internal screw thread adapted to cooperate with the screw thread on the outside of said supporting member, and at least three longitudinal spaced-apart recesses on the outside of said skirt open towards the top; a sealing disc formed of a material resistant to attack by the materials to be placed within said vessel, including generally planar portions interposed between said cap and said rim of said bucket, said planar portions of said sealing disc being pressed onto said rim by rotational closing of said cap on said supporting member by means of said cooperating screw thread.

The peripheral surfaces of both the supporting member and the cap are provided with distinctive marks which serve to indicate the sealing pressure between the rim and the sealing disc by the angular displacement of the mark on the cap surface in relation to the marks on the supporting member during forceful closure.

In the preferred embodiment the cap is provided with a single mark and the supporting member with a scale of vertical lines on its circumference, whereby the distance between each two lines corresponds to a given increase in torque and, accordingly, in sealing pressure.

In a preferred embodiment both the bottom and the top of the decomposition vessel are planar and parallel; in addition both the bottom of the supporting member and the top of the cap are centrally perforated by a small-diameter hole, serving to extract the bucket and the sealing disc by means of a pin pushed through these holes.

Special tools are employed for closing or opening of the decomposition vessel, which engage with at least three of the recesses each in the cap and the supporting member, by means of upstanding projections provided on the tools. The tool serving to grip the supporting member may be fastened to a table top, while the tool serving to grip the cap is preferably provided with a long handle to enable the necessary torque to be applied without major physical effort.

The procedure of closing the vessel to the desired sealing pressure is as follows; after the materials to be decomposed have been filled into the Teflon bucket the cap—with the teflon disc inserted—is screwed onto the supporting member and tightened by hand to its limit. The position of the incision on the cap is marked on the scale and the two tools are now slipped over the ends of the outer parts and tightened until the incision has passed to—say—a second or third line on the scale, counting from the marked line, according to the sealing pressure required. The tools are released and the vessel is now ready for heating.

It is understood that slots or recesses provided on the rim of component parts are being used to rotate and to tighten one on the other, as for instance lids on containers or rings on ball bearings, but up to now this closure has been performed by engaging a hook-shaped tool with one of the slots, or by using a nail to increase the leverage. These closure means are being disclosed in U.S. Pat. Nos. 1,150,596 and 2,449,511, however they are not designed, as in the present case, for exerting considerable torque by using two closing tools on opposite ends of a vessel, both engaging with at least three slots.

It has also been proposed to apply a predetermined tension to caps adapted to close cans or similar containers, by turning these caps by hand until two signs or marks coincide. Closures of this kind are described in U.S. Pat. Nos. 4,138,029 and 3,216,600.

However, these features are quite unknown as a combination, permitting the closing of high-pressure vessels to an exact degree as in the present case, where the two components are tightened by rotating them about an exact predetermined angle, using two spanners specifically designed for this task and adapted to the outer shape of the cylindrical end portions of the decomposition vessel.

In the accompanying drawings which illustrate, by way of example, one embodiment of the decomposition vessel and of the tools employed for tightening its sealing surfaces, FIG. 1a is part side view and part vertical section of a decomposition vessel in accordance with the invention.

FIG. 4 is a modification of the tool illustrated in FIG. 2, and

FIG. 5 is a modification of the tool illustrated in FIG. 3.

Figure 1A:
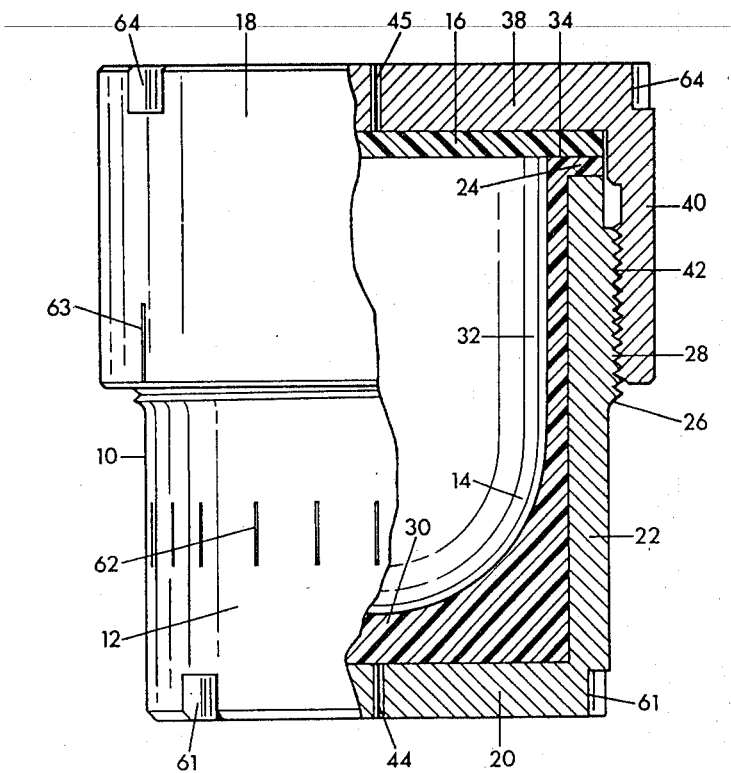
FIG. 1b is a vertical section through a bucket having a small reaction volume.

Referring now to FIG. 1a of the drawings, a decomposition vessel according to a preferred construction is designated generally by the reference numeral 10 and comprises basically a supporting member 12, a bucket or liner therefor 14, a sealing disc 16 and a cap 18.

The supporting member 12 includes a bottom 20 and peripheral sidewalls 22 terminating in an upstanding ledge. Spaced immediately below the upstanding ledge is a raised screw thread 28 extending along a third of the total height of the member. The outside of the member adjacent to its bottom is interrupted by at least three grooves or recesses 61 extending in a direction parallel to the vessel axis and open towards the bottom portion of the vessel. In the upper portion of the peripheral sidewall a scale of equidistant vertical lines 62 is incised which may surround the entire vessel or only a portion thereof.

The bucket 14 includes a bottom 30 and peripheral sides 32 terminating in an outstanding flange 24 which overlies the ledge and has an upstanding rim 34, preferably planar as shown in the drawing.

The sealing disc 16 is preferably merely a planar member which is dimensioned to completely overlie the rim 34, being of the same diameter as the flange 24.

The cap 18 has a top portion 38 and a downwardly depending skirt 40 including internal screw thread 42 adapted to cooperate with the screw thread 28 on the supporting member 12 for releasably securing the cap 18 to the supporting member 14. The top portion of the outer surface is provided with at least three grooves or recesses 64, only two being visible in the drawing. These grooves or recesses are open towards the cap top and extend parallel to the vessel axis to less than the thickness of the top portion 38.

A vertical mark 63 is incised near the bottom edge of the skirt 40. The top portion is centrally perforated by a small-diameter bore 45.

The bucket 14 is preferably designed to removably fit within the supporting member 12 with the bottom 30 of the bucket supported by the bottom 20 of the supporting member and the sides 32 of the bucket supported by the sides 22 of the supporting member. A small vent hole 44 is provided in the bottom of the supporting member 12 to preclude air resistance to insertion of the bucket, thereby ensuring intimate supporting contact between the interior of the supporting member and the exterior of the bucket.

The sealing disc 16 fits tightly into the upper cap opening and can be removed therefrom by means of a pin stuck through the hole 45. The planar engagement of portions of the sealing disc 16 with the rim 34 of the bucket ensures excellent sealing contact while precluding the possibility of enlargement of one of the sealing elements as would result if tapered sealing areas were provided as with prior art constructions.

Figure 1B:
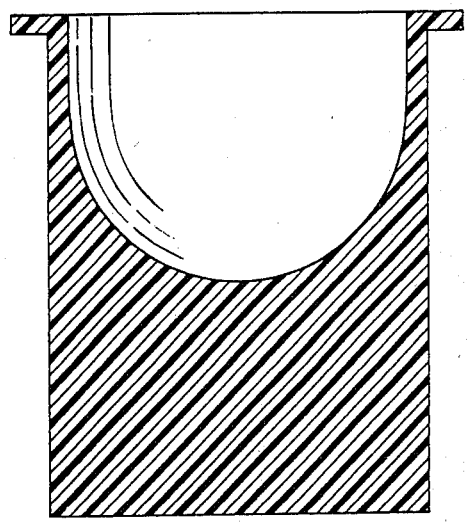

The bucket illustrated in FIG. 1b has the same outside dimensions as the bucket shown in FIG. 1a, but its inner hollow portion is of a volume about one half of the volume of the firstmentioned bucket. This permits the alternative use of different Teflon inserts of various reaction volume in one existing supporting metal vessel, making it thereby fit for various purposes.

Figure 2:
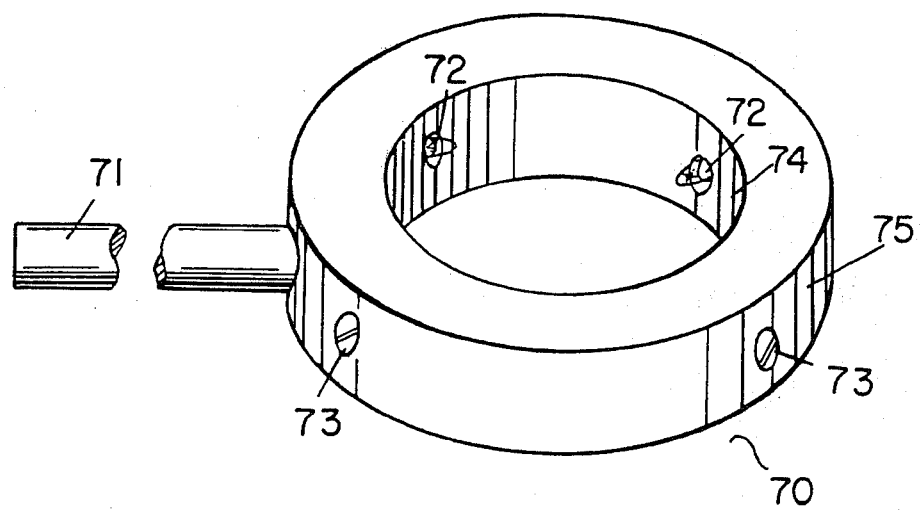
FIG. 2 is a perspective view of a movable tool for gripping the top of the cap.

Referring now to FIG. 2 of the drawing a closing tool comprises a ring 70 and a handle 71 radially attached to the ring's outer surface. A set required for tightening of the vessel illustrated in FIG. 1 comprises two tools of different size and provided with from two to eight teeth, the tool shown in the above Figure being designated for gripping the cap, having an inner diameter slightly larger than the outer diameter of the cap. Four teeth 72 project inwardly from the inner ring surface 74, which are spaced-apart and sized correspondingly to four recesses in the cap. As illustrated, they consist of the pointed ends of four screws 73 which are fastened in four radial, screw-threaded bores extending from the outer ring surface 75 to the inner surface 74. The handle 71 is preferably fastened to the ring by means of another radial bore.

Figure 3:
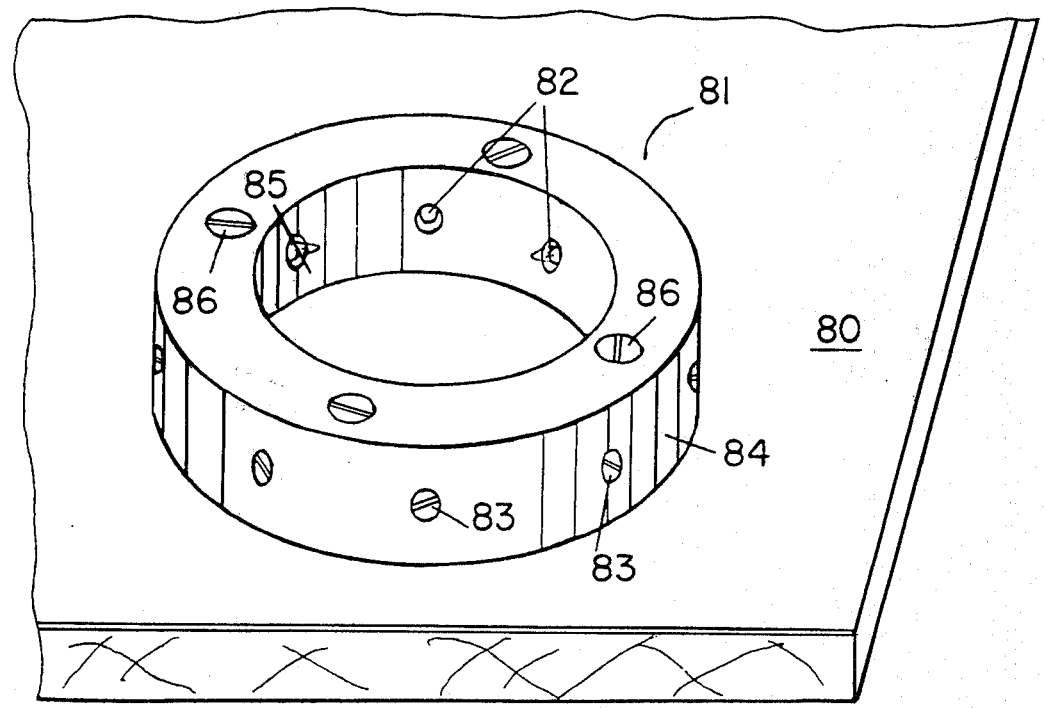
FIG. 3 is a perspective view of a stationary tool adapted for fixation on a surface and for insertion therein of the supporting member of a decomposition vessel.

FIG. 3 illustrates a fixed tool suitable for fixation on a table top 80 and for engagement with the bottom of supporting member 12. It consists of a ring 81 that is provided with eight inwardly projecting and evenly spaced teeth 82, consisting of the pointed ends of screws 83 which are radially fixed in eight screw-threaded bores in the ring extending from the outer surface 84 to the inner surface 85. The ring is fastened to the table top by four bolts 86 passing through four holes extending through the ring in vertical direction.

The closing tools of FIGS. 4 and 5 which are adapted to engage with the respective recesses in the cap and the supporting member, are similar, in that both comprise an elongated base plate 90 provided at its one narrow end with a bar handle 91. Two fixed pins 92 are provided at the other narrow end, and a movable, threaded pin 94 is fastened in one of three threaded bores 93 positioned symmetrically to the two fixed pins 92 at different distances therefrom. The three positions of the movable pin in one of the three bores 93 permit the use of the tools for the closing and opening of vessels of three different sizes, and it is apparent from the drawings that the distance of these bores from the fixed pins is different in the tool destined for the supporting member and in the tool destined for the cap. The tool of FIG. 5 is, in addition, provided with two countersunk bores 95 which can be used for bolting the tool to a table top. The use and operation of the basic decomposition vessel will be readily understood: With the bucket supported by the supporting member 12, the reactants may be placed in the bucket and the cap 18 threadably engaged with the supporting member 12 after the sealing disc 16 has been interposed between the top 38 of the cap 18 and the rim 34 of the bucket 14.

Sufficient force may be provided with this construction by mere manual engagement of the thread means 28, 42 to provide a sealing pressure between the rim 34 of the bucket and the portions of the sealing disc 16 contacted thereby which will preclude liquid or vapor loss during chemical reactions which will develop low to medium pressures. With higher pressures experienced with decomposition reactions of organic materials the vessel is closed and tightened manually to the limit of the strength of the operator's hands. The position of the mark 63 on the cap in relation to the scale 62—which latter may be numbered—is noted or indicated on the supporting member by a chalk mark or the like, and the vessel is now engaged by the tools fitting over the cap and the supporting member respectively. Depending on the sealing pressure required the tools are turned in opposite angular direction—until the mark 63 is moved to another line on the scale, removed from the initial line by a distance predetermined by calculation of the necessary torque required to obtain the required sealing pressure.

The lines of the scale are spaced in such a manner that a shifting of the mark 63 by one to three divisions on the scale 62 will cover the tightening torque from a minimum of 1 kg.m to a maximum of 3 kg.m, thus one division corresponding to about 1 kg.m-torque.

Opening of the vessel is made in a similar manner, with the tools rotated in opposite directions as before.

It is selfunderstood that, as an alternative, the scale of vertical lines may be incised on the cap's outer surface, while a mark in the shape of a vertical line may be incised on the outer surface of the supporting vessel.

Due to the nature of the construction of the decomposition vessel of the present invention, the device may be used repeatedly with the assurance that the seal will remain both liquid-and vapor-tight. If necessary, the bucket and the sealing disc may be readily replaced, although this will generally not be necessary for extended periods.

Once again, it should be emphasized that a relatively high sealing pressure can be provided by the present construction due to the limited contact area between the rim 34 of the bucket 14 and the sealing disc 16.

Since many embodiments may be made of the present invention concepts, and since many modifications may be made of the embodiments shown and described, it is to be understood that the foregoing disclosure is to interpreted as illustrative and not as limiting.

What I claim is:

1. A liquid-and vapor-tight decomposition vessel and closing tool kit comprising a rigid integral, cylindrical supporting member having a bottom, peripheral sides and an upstanding ledge surrounding an opening, a raised circumferential outer thread provided on its outside below said ledge, at least three longitudinal, spaced-apart recesses on its outside at the bottom end, a rigid integral cap releasably secured to said supporting member, having a closed top portion, a downwardly depending skirt portion provided with internal thread adapted to cooperate with said outer thread on said supporting member, at least three longitudinal, spaced-apart recesses on the outside at the top end, means for determining the tightening torque of said cap relative to said supporting member within a range of 1 kg.m to 3 kg.m, said means including a mark on the outside peripheral side of said supporting member and a mark on the outside skirt portion of said cap, a rigid, integral bucket of a plastic material formed of polytetrafluoroethylene including a bottom, peripheral sides and an upstanding rim, closely fitting into said opening of said supporting member, a sealing disc of a plastic material formed of polytetrafluoroethylene, interposed between the top of said cap and said upstanding rim of said bucket, a closing tool provided with at least three projections adapted to engage with said recesses in said supporting member, and a closing tool provided with at least three projections adapted to engage with said recesses in said cap.

2. The decomposition vessel of claim 1, wherein said cap is provided with a central perforation in its top portion.

3. The decomposition vessel of claim 1, wherein said supporting member is provided with a central perforation in its bottom.

4. The decomposition vessel of claim 1, wherein said mark on said supporting member comprises a scale of equidistant vertical lines on its circumferential surface.

5. The decomposition vessel of claim 1, wherein said mark on said cap is in the form of a vertical line on its circumferential surface.

6. The decomposition vessel of claim 1, wherein each closing tool comprises a ring with a number of inwardly protruding projections, corresponding to the number of recesses to be engaged.

7. The decomposition vessel of claim 1, wherein each closing tool comprises a base plate provided with two upstanding fixed pins and with one upstanding movable, threaded pin, adapted to be fastened in one of three threaded bores, provided in said base plate at different distances from said fixed pins.

* * * * *